US012354443B2

(12) United States Patent
Huke et al.

(10) Patent No.: US 12,354,443 B2
(45) Date of Patent: *Jul. 8, 2025

(54) METHOD OF USING TELEMETRY DATA TO DETERMINE WAGER ODDS AT A LIVE EVENT

(71) Applicant: AdrenalineIP, Washington, DC (US)

(72) Inventors: Casey Alexander Huke, Washington, DC (US); John Cronin, Jericho, VT (US); Michael D'Andrea, Burlington, VT (US); Joseph W. Beyers, Saratoga, CA (US)

(73) Assignee: AdrenalineIP, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/738,311

(22) Filed: Jun. 10, 2024

(65) Prior Publication Data

US 2024/0331505 A1 Oct. 3, 2024

Related U.S. Application Data

(63) Continuation of application No. 17/718,608, filed on Apr. 12, 2022, now Pat. No. 12,008,863.

(60) Provisional application No. 63/253,223, filed on Oct. 7, 2021.

(51) Int. Cl.
*G07F 17/32* (2006.01)

(52) U.S. Cl.
CPC ...... *G07F 17/3269* (2013.01); *G07F 17/3227* (2013.01); *G07F 17/3288* (2013.01)

(58) Field of Classification Search
CPC ............ G07F 17/3269; G07F 17/3227; G07F 17/3288
See application file for complete search history.

(56) References Cited

U.S. PATENT DOCUMENTS

2020/0234543 A1 7/2020 Schwartz et al.

*Primary Examiner* — Kevin Y Kim
(74) *Attorney, Agent, or Firm* — Maier & Maier, PLLC

(57) ABSTRACT

The present disclosure provides a system and method of using telemetry data to determine wager odds by receiving time-stamped position information captured by sensors, such as telemetry data, of one or more participants of one or both is the first set of participant(s) and/or the at least second set of participant(s) in the competition, and then using the time-stamped position information to determine a first play situation of the competition, and determining the probability and wager odds of a first future event occurring at the competition based on at least the first play situation and playing data associated with at least a subset of one or both of the first set of one or more participants and the at least second set of one or more participants and historical playing data.

8 Claims, 3 Drawing Sheets

| Difference in Correlations | Odds Adjustment |
|---|---|
| + 0-2 | 5% increase |
| - 0-2 | 5% decrease |
| + 3-5 | 10% increase |
| - 3-5 | 10% decrease |
| + 6-8 | 15% increase |
| - 6-8 | 15% decrease |
| --- | --- |
| --- | --- |
| --- | --- |

Fig. 4

| Wager ID | Adjustment |
|---|---|
| 201 | 5% increase |
| 202 | 5% decrease |
| --- | --- |
| --- | --- |
| --- | --- |

Fig.5

METHOD OF USING TELEMETRY DATA TO DETERMINE WAGER ODDS AT A LIVE EVENT

CROSS-REFERENCE TO RELATED APPLICATIONS

The present patent application is a continuation application of U.S. application Ser. No. 17/718,608 filed Apr. 12, 2022 which claims benefit and priority to U.S. Provisional Patent Application No. 63/253,223 filed on Oct. 7, 2021, which is hereby incorporated by reference into the present disclosure.

FIELD

The present disclosure generally relates to in-play wagering on live sporting events.

BACKGROUND

Currently, wagering platforms and wagering applications do not incorporate telemetry data to determine wager odds.

Also, wagering platforms and applications do not consistently and effectively use players' exact positioning on a playing surface to assist in determining probabilities of events that may affect wager odds.

Lastly, wagering platforms and applications do not fully utilize players' current and historical positioning in specific situations to assist in determining wager odds.

BRIEF DESCRIPTIONS OF THE DRAWINGS

The accompanying drawings illustrate various embodiments of systems, methods, and various other aspects of the embodiments. Any person having ordinary skill in the art will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 4 illustrates a recommendations database, according to an embodiment.

FIG. 5 illustrates an adjustment database, according to an embodiment.

DETAILED DESCRIPTION

Figure 1:
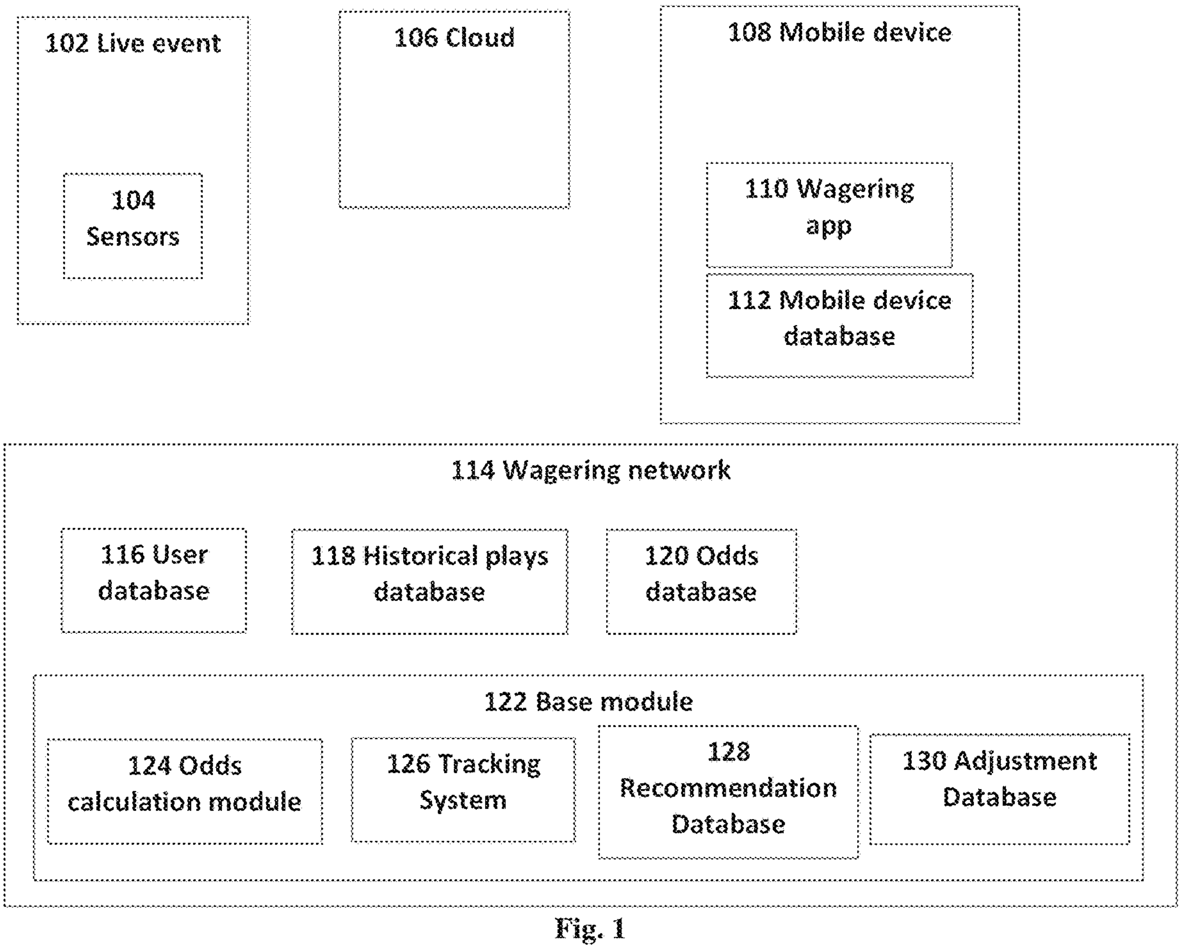
FIG. 1 illustrates a system for using telemetry data to determine wager odds at a live event, according to an embodiment.

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention As used herein, the word exemplary means serving as an example, instance, or illustration. The embodiments described herein are not limiting but rather are exemplary only. It should be understood that the described embodiments are not necessarily to be construed as preferred or advantageous over other embodiments. Moreover, the terms embodiments of the invention, embodiments, or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that specific circuits can perform the various sequence of actions described herein (e.g., application-specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in several different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of the terminology used herein is provided.

An action refers to a specific play or specific movement in a sporting event. For example, an action may determine which players were involved during a sporting event. In some embodiments, an action may be a throw, shot, pass, swing, kick, hit performed by a participant in a sporting event. In some embodiments, an action may be a strategic decision made by a participant in the sporting event, such as a player, coach, management, etc. In some embodiments, an action may be a penalty, foul, or type of infraction occurring in a sporting event. In some embodiments, an action may include the participants of the sporting event. In some embodiments, an action may include beginning events of sporting events, for example, opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity based on the outcome of a future event, such as the results of a game or event. It may be understood that non-monetary items may be the subject of a "bet" or "wager" as well, such as points or anything else that can be quantified for a "wager" or "bet." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be made for a certain amount or for a future time. A "bet" or "wager" can be made for being able to answer a question correctly. A "bet" or "wager" can be made within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to a set of both implicit and explicit rules, in an electronically powered domain to place bets on the outcome of a sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example, up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to as "chalk eaters" (often a derogatory term). An event or game in which the sportsbook has reduced its betting limits, usually because of weather or the uncertain status of injured players, is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides," "favorite," "chalk," "circled game," "laying the points price," "dog," and "underdog" can be integrated into the embodiments in a variety of manners.

The "money line" refers to the odds expressed in terms of money. With money odds, whenever there is a minus (−), the player "lays" or is "laying" that amount to win (for example, $100); where there is a plus (+), the player wins that amount for every $100 wagered. A "straight bet" refers to an individual wager on a game or event that will be determined by a point spread or money line. The term "straight-up" means winning the game without any regard to the "point spread"; a "money-line" bet. "Money line," "straight bet," "straight-up" can be integrated into the embodiments in a variety of manners.

The "line" refers to the current odds or point spread on a particular event or game. The "point spread" refers to the margin of points by which the favored team must win an event to "cover the spread." To "cover" means winning by more than the "point spread." A handicap of the "point spread" value is given to the favorite team so bettors can choose sides at equal odds. "Cover the spread" means that a favorite wins an event with the handicap considered, or the underdog wins with additional points. To "push" refers to when the event or game ends with no winner or loser for wagering purposes, a tie for wagering purposes. A "tie" is a wager in which no money is lost or won because the teams' scores equal the number of points in the given "point spread." The "opening line" means the earliest line posted for a particular sporting event or game. The term "pick" or "pick 'em" refers to a game when neither team is favored in an event or game. "Line," "cover the spread," "cover," "tie," "pick," and "pick-em" can be integrated into the embodiments in a variety of manners.

To "middle" means to win both sides of a game, wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to a set of both implicit and explicit rules in an electronically powered domain for the purpose of recreation or instruction. "eSports" refers to a form of sports competition using video games or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. The event can be integrated into the embodiments in a variety of manners.

The "total" is the combined number of runs, points, or goals scored by both teams during the game, including overtime. The "over" refers to a sports bet in which the player wagers that the combined point total of two teams will be more than a specified total. The "under" refers to bets that the total points scored by two teams will be less than a certain figure. "Total," "over," and "under" can be integrated into the embodiments in a variety of manners.

A "parlay" is a single bet that links together two or more wagers; to win the bet, the player must win all the wagers in the "parlay." If the player loses one wager, the player loses the entire bet. However, if he wins all the wagers in the "parlay," the player wins a higher payoff than if the player had placed the bets separately. A "round robin" is a series of parlays. A "teaser" is a type of parlay in which the point spread or total of each individual play is adjusted. The price of moving the point spread (teasing) is lower payoff odds on winning wagers. "Parlay," "round-robin," "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games, and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events. Typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers are scheduled to start a game start. If they don't, the bet is deemed "no action" and refunded. The "run line" in baseball refers to a spread used instead of the money line. "Listed pitchers" and "no action" and "run line" can be integrated into the embodiments in a variety of manners.

The term "handle" refers to the total amount of bets taken. The term "hold" refers to the percentage of the house wins. The term "juice" refers to the bookmaker's commission, most commonly the 11 to 10 bettors lay on a straight point spread wagers: also known as "vigorish" or "vig." The "limit" refers to the maximum amount accepted by the house before the odds and/or point spread are changed. "Off the board" refers to a game in which no bets are being accepted. "Handle," "juice," vigorish," "vig," and "off the board" can be integrated into the embodiments in a variety of manners.

"Casinos" are public rooms or buildings where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations, or individuals that would deploy, for fees, and may be part of, or perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling, and (4) customer service assistance. These managed service compliance services can be integrated into the embodiments in a variety of manners.

Managed service pricing and trading service is a service that helps customers with (1) official data feeds, (2) data visualization, and (3) land-based, on-property digital signage. These managed service pricing and trading services can be integrated into the embodiments in a variety of manners.

Managed service and technology platforms are services that help customers with (1) web hosting, (2) IT support, and (3) player account platform support. These managed service and technology platform services can be integrated into the embodiments in a variety of manners.

Managed service and marketing support services are services that help customers (1) acquire and retain clients and users, (2) provide for bonusing options, and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for the integration of global and local payment methods. These payment processing services can be integrated into the embodiments in a variety of manners.

Engaging promotions allow customers to treat your players to free bets, odds boosts, enhanced access, and flexible cashback to boost lifetime value. Engaging promotions can be integrated into the embodiments in a variety of manners.

"Cash out" or "pay out" or "payout" allow customers to make available, on singles bets or accumulated bets with a partial cash-out where each operator can control payouts by managing commission and availability at all times. The "cash-out" or "payout" or "payout" can be integrated into the embodiments in a variety of manners, including both monetary and non-monetary payouts, such as points, prizes, promotional or discount codes, and the like.

"Customized betting" allows customers to have tailored personalized betting experiences with sophisticated tracking and analysis of players' behavior. "Customized betting" can be integrated into the embodiments in a variety of manners.

Kiosks are devices that offer interactions with customers, clients, and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, from creating and delivering actionable insights on performance to help customers to manage sports gaming. Business Applications can be integrated into the embodiments in a variety of manners.

State-based integration allows for a given sports gambling game to be modified by states in the United States or countries, based upon the state the player is in, based upon mobile phone or other geolocation identification means. State-based integration can be integrated into the embodiments in a variety of manners.

Game Configurator allows for the configuration of customer operators to have the opportunity to apply various chosen or newly created business rules on the game and to parametrize risk management. The game configurator can be integrated into the embodiments in a variety of manners.

"Fantasy sports connectors" are software connectors between method steps or system elements in the embodiments that can integrate fantasy sports. Fantasy sports allow a competition in which participants select imaginary teams from among the players in a league and score points according to the actual performance of their players. For example, if a player in fantasy sports is playing at a given real-time sport, odds could be changed in the real-time sports for that player.

Software as a service (or SaaS) is a software delivery method and licensing in which software is accessed online via a subscription rather than bought and installed on individual computers. Software as a service can be integrated into the embodiments in a variety of manners.

Synchronization of screens means synchronizing bets and results between devices, such as TV and mobile, PC, and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without user-based input or search efforts. A short media clip (audio, video, or both) is selected to start the recognition. This clip could be selected from within a media file or recorded by a device. Through algorithms such as fingerprinting, information from the actual perceptual content is taken and compared to a reference fingerprint database, each reference fingerprint corresponding to a known recorded work. A database may contain metadata about the work and associated information, including complementary media. If the media clip's fingerprint is matched, the identification software returns the corresponding metadata to the client application. For example, a "fumble" could be recognized during an in-play sports game, and metadata such as "fumble" could be displayed at the time stamp of the event. Automatic content recognition (ACR) can be integrated into the embodiments in a variety of manners.

Joining social media means connecting an in-play sports game bet or result to a social media connection, such as FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real-time view of the game can be seen, and a "bet," a computer-generated data point, is placed above the player bet on. Augmented reality can be integrated into the embodiments in a variety of manners.

A betting exchange system is a platform that matches up users who wish to take opposite sides in a bet. Users may "back" or "lay" wagers on the outcome of a sporting event or a portion of the event. Each wager on a betting exchange involves two bets, one backing and one laying. Back betting, or "backing" a selection, is to wager that the outcome will occur. Lay betting, or "laying" a selection, is to wager that the outcome will not occur. Users may then trade those positions up until the point that the wagering market closes and the wagers are paid out. The value of a wager may increase or decrease based as a sporting event progresses. Exchanges allow users to cash out of their position before the market for a wager closes by selling that wager at the current price to another user on the exchange.

Betting exchange systems allow users to wager on what is not going to happen with "lay" wagers. More often than not, users are more likely to win money by betting on what's not going to happen. Take the correct score markets in soccer, for example. Picking the exact score in a game is impossible to do consistently. One might get it right now and then, but it just comes down to luck. There are so many possible options to choose from. There are nine potential score outcomes even if we could rule out either team scoring more than two goals.

Betting exchange systems may allow wagers involving more than two users as exchange betting allows for one lay bet to be backed by multiple users, each backing a portion of the lay bet. Those wagers may be at different odds. For example, a first user may want to back Team A to win for $20. There may be a second user, or users, who want to lay $10 on Team A not to win at 2 to 1 odds. There may also be a third user, or users, who want to lay $10 on Team A not to win at 3 to 1 odds. The first user may back team A to win for $10 at the best available odds, in this case, 2 to 1. If the first user wants to back team A to win for $20, they will need to back ten dollars at 2 to 1 against the second user and back the other ten dollars against the third user at 3 to 1. This combination of wagers is the equivalent backing Team A to win for $20 at 2.5 to 1 odds.

Betting exchange systems do not take on the risk of any given wager as a traditional sportsbook would as the exchange users set the odds. Removing the risk to the wagering platform allows users to get more value out of a wager as they are paying less to the exchange that does not have to take on the risk that a sportsbook must price into each wager. There is no inherent limit to the stakes or odds that a user of a betting exchange can propose. Betting exchange systems derive revenue from wagers differently than traditional sportsbooks. Revenue is based on the volume of wagers and trades on their platform, removing the results of the wager immaterial to the betting exchange system operation. Betting exchange systems do not lay bets themselves but instead rely on users to offer up their wagers, and the betting exchange system's role is to facilitate the exchange of wager terms, trades of wagers, and settlement of wagers.

Betting exchange systems do not tend to limit or ban successful users the way traditional sportsbooks do. Betting exchange systems do not limit or ban successful users because there is no impact to the betting exchange system from a user's success. A successful user needs only to find someone to take the other side of their wager. A betting exchange system benefits from the increased liquidity brought to markets by successful gamblers.

Betting exchange systems are not limited in the wagers they can offer. A traditional sportsbook will only offer wagers on which they have calculated odds to offer. Users of a betting exchange system may create their own markets for any outcome and odds that have at least one user to back and at least one user to lay a given outcome. Users may also be able to wager at a different price than the market price. For example, if a user is confident the price on a team they want to back is going to drift to a bigger price due to team news, they can put a request up and set a higher price than is currently available, and another user may think they are wrong about their estimation and be prepared to match their bet at the bigger price.

Betting exchange systems may present information related to the exchange and potential wagers to back or lay in several different ways. Some betting exchange systems use a standard or grid interface that puts the back and lay options laid out left to right, with the prices getting higher as you move away from the center. The amount of money or action at a given back or lay price is often displayed. Some betting exchange systems offer an option to back all or lay all. This option allows a user to back or lay an outcome at multiple different prices. A user may not need to back all or lay all to wager at multiple prices on a given outcome.

A "ladder" interface is a view in which that the full market depth of a market on a betting exchange system is shown, along with all the values associated with that price (volume already traded, amounts available, etc.). This type of interface enables a user to see where the market has been and helps them evaluate where it might be heading in the short term. Users may define a default "stake" or wager amount that, once defined, will allow the user to place orders immediately with a single click on the back or lay option at the price the user wants to enter the market at. Users may remove their stake in the same fashion if another user has not yet accepted the stake. Ladder interfaces allow users to place a large number of trades in a short time. This trading volume allows users to win, not only if their selection is successful but by hedging their position across all possible outcomes. Each tick (price increment) on the ladder would display to the user their financial position if they closed at this point. Some betting exchange systems show a graphical representation of where the selection has been matched. Some show the user where they are in the queue of contracts to be met. Third-party software providers receive data from the betting exchange system through an API to allow users to customize their interface and functionality. These third-party software programs may also allow users to incorporate additional data feeds, such as a news feed related to the live sporting event, into the user's wagering interface.

A betting exchange system offers users multiple ways to win. Users may be able to use automated bots to manage their betting activity. Users who lack the expertise to create bots may set up betting triggers that automate certain betting behaviors when specific market prices are met. Users may engage in "position trading" in which bets may be placed with the intent to sell them off, seeking to find opportunities in market swings. Betting exchanges allow users many "hedging" options that may incorporate one or more of these strategies to mitigate risk. Liquidity in betting exchange systems may be limited by regulations that restrict participants in an exchange bet. Therefore, a betting exchange system should take steps to maximize the amount of liquidity on their platform to ensure the most markets are available.

A betting exchange system relies on liquidity to ensure market availability. Markets will only be available if there is someone to both back and lay that market. There will be fewer markets available on a betting exchange if fewer people offer odds, and fewer people offer odds if fewer people accept them. If the people are not offering odds and there is no traditional bookmaker to do it, their markets cannot be created, and wagers cannot be placed.

A machine learning betting system is a system that incorporates machine learning into at least one step in the odds makings, market creation, user interface, or personalization of a sports wagering platform. Machine learning leverages artificial intelligence to allow a computer algorithm to improve itself automatically over time without being explicitly programmed. Machine learning and AI are often discussed together, and the terms are sometimes used interchangeably, but they don't mean the same thing. An important distinction is that although all machine learning is AI, not all AI is machine learning. Machine learning algorithms can develop their framework for analyzing a data set through experience in using that data. Machine learning helps create models that can process and analyze large amounts of complex data to deliver accurate results. Machine learning uses models or mathematical representations of real-world processes. It achieves this through examining features, measurable properties, and parameters of a data set. It may utilize a feature vector, or a set of multiple numeric features, as a training input for prediction purposes. An algorithm takes a set of data known as "training data" as input. The learning algorithm finds patterns in the input data and trains the model for expected results (target). The output of the training process is the machine learning model. A model may then make a prediction when fed input data. The value that the machine learning model has to predict is called the target or label. When excessively large amounts of data are fed to a machine learning algorithm, it may experience overfitting, a situation in which the algorithm learns from noise and inaccurate data entries. Overfitting may result in data being labeled incorrectly or in predictions being inaccurate. An algorithm may experience underfitting when it fails to decipher the underlying trend in the input data set as it does not fit the data well enough.

A machine learning betting system will measure error once the model is trained. New data will be fed to the model, and the outcome will be checked and categorized into one of four types of results: true positive, true negative false positive, and false negative. A true positive result is when the model predicts a condition when the condition is present. A true negative result is when the model does not predict a condition when it is absent. A false-positive result is when the model predicts a condition when it is absent. A false negative is when the model does not predict a condition when it is absent. The sum of false positives and false negatives is the total error in the model. While an algorithm or hypothesis can fit well to a training set, it might fail when applied to another data set outside the training set. It must therefore be determined if the algorithm is fit for new data. Testing it with a set of new data is the way to judge this. Generalization refers to how well the model predicts outcomes for a new set of data. Noise must also be managed and data parameters tested. A machine learning betting system may go through several cycles of training, validation, and testing until the error in the model is brought within an acceptable range.

A machine learning betting system may use one or more types of machine learning. Supervised machine learning algorithms can use data that has already been analyzed, by a person or another algorithm, to classify new data. Analyzing a known training dataset allows a supervised machine learning algorithm to produce an inferred function to predict output values in the new data. As input data is fed into the model, it changes the weighting of characteristics until the model is fitted appropriately. This supervised learning is part of a process to ensure that the model avoids overfitting or underfitting called cross-validation. Supervised learning helps organizations solve various real-world problems at scale, such as classifying spam in a separate email folder.

Supervised machine learning algorithms are adept at dividing data into two categories, or binary classification, choosing between more than two types of answers, or multi-class classification, predicting continuous values, or regression modeling, or combining the predictions of multiple machine learning models to produce an accurate prediction, also known as ensembling. Some methods used in supervised learning include neural networks, naïve Bayes, linear regression, logistic regression, random forest, support vector machine (SVM), and more. A supervised machine learning betting system may be provided a dataset of historical sporting events, the odds of various outcomes of those sporting events, and the action waged on those outcomes, and use that data to predict the action on future outcomes by identifying similar historical outcomes. A machine learning betting system may utilize recommendation algorithms to learn user preferences are for teams, players, sports, wagers, etc.

Unsupervised machine learning analyzes and clusters data that has not been analyzed yet to discover hidden patterns or groupings within the data without the need for a human to define what the patterns or groupings should look like. The ability of unsupervised machine learning algorithms to discover similarities and differences in information makes it the ideal solution for exploratory data analysis, cross-selling strategies, customer segmentation, image, and pattern recognition. Most types of deep learning, including neural networks, are unsupervised algorithms.

Unsupervised machine learning may be utilized in dimensionality reduction or the process of reducing the number of random variables under consideration by identifying a set of principal variables. Unsupervised machine learning may split datasets into groups based on similarity, also known as clustering. It may also engage in anomaly detection by identifying unusual data points in a data set. It may also identify items in a data set that frequently occur together, also known as association mining. Principal component analysis and singular value decomposition are two methods of dimensionality reduction that may be employed. Other algorithms used in unsupervised learning include neural networks, k-means clustering, probabilistic clustering methods, and more.

A machine learning betting system may fall between a supervised machine learning algorithm and an unsupervised one. In these systems, an algorithm used training on a smaller labeled dataset to identify features and classify a larger, unlabeled dataset. These types of algorithms perform better when provided with labeled data sets. However, labeling can be time-consuming and expensive, which is where unsupervised learning can provide efficiency benefits. For example, a sportsbook may identify a cohort of users in a dataset who exhibit desirable behavior. A semi-supervised machine learning betting system may use that to identify other users in the cohort who are desirable.

Reinforcement learning is when data scientists teach a machine learning algorithm to complete a multi-step process with clearly defined rules. The algorithm is programmed to complete a task and is given positive and negative feedback or cues as it works out how to complete the task it has been given. The prescribed set of rules for accomplishing a distinct goal will allow the algorithm will learn and decide which steps to take along the way. This combination of rules along with positive and negative feedback would allow a reinforcement learning machine learning betting system to optimize the task over time. A machine learning betting system may utilize reinforcement learning to identify potential cheaters by recognizing a series of behaviors associated with undesirable player conduct, cheating, or fraud.

Some embodiments of this disclosure, illustrating all its features, will now be discussed in detail. It can be understood that the embodiments are intended to be open-ended in that an item or items used in the embodiments is not meant to be an exhaustive listing of such items or items or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for using telemetry data to determine wager odds at a live event. This system may include a live event 102, for example, a sporting event such as a football, basketball, baseball, or hockey game, tennis match, golf tournament, eSports or digital game, etc. The live event 102 may include some number of actions or plays, upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team would need to cover if the result of the game with the same as the point spread the user would not cover the spread, but instead the tie is called a push. If the user bets on the favorite, points are given to the opposing side, which is the underdog or longshot. Betting on all favorites is referred to as chalk and is typically applied to round-robin or other tournaments' styles. There are other types of wagers, including, but not limited to, parlays, teasers, and prop bets, which are added games that often allow the user to customize their betting by changing the odds and payouts received on a wager. Certain sportsbooks will allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle which limit the amount of wagers they can take on either side of a bet before they will move the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point spreads to middle, and win, both bets. Sportsbooks will often offer bets on portions of games, such as first-half bets and half-time bets. Additionally, the sportsbook can offer futures bets on live events in the future. Sportsbooks need to offer payment processing services to cash out customers which can be done at kiosks at the live event 102 or at another location.

Further, embodiments may include a plurality of sensors 104 that may be used such as motion, temperature, or humidity sensors, optical sensors and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include, but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and/or a wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the internet, and relies on sharing resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 114, which may perform real-time analysis on the type of play and the result of the play. The cloud 106 may also be synchronized with game situational data such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play, and may be compared with a variety of team data and league data based on a variety of elements, including the current down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include, but are not limited to, keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide semiconductor (CMOS) sensors, accelerometers, infrared optical sensors, pressure sensors, magnetometer sensors, angular rate sensors, depth sensors, proximity sensors, ambient light sensors, gyroscopic sensors, or other sensors. Output devices may include, but are not limited to, video displays, graphical displays, speakers, headphones, inkjet printers, laser printers, or 3D printers. Devices may include, but are not limited to, a combination of multiple input or output devices such as, Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs including, but not limited to, Microsoft KINECT, SIRI for iPhone by Apple, Google Now, or Google Voice Search. Additional user devices have both input and output capabilities including, but not limited to, haptic feedback devices, touchscreen displays, or multi-touch displays. Touchscreen, multi-touch displays, touchpads, touch mice, or other touch sensing devices may use different technologies to sense touch, including but not limited to, capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices including, but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, FireWire, Ethernet, Gigabit Ethernet, Fiber Channel, or Thunderbolt buses. In some embodiments, the mobile device 108 could be an optional component and would be utilized in a situation where a paired wearable device employs the mobile device 108 for additional memory or computing power or connection to the internet.

Further, embodiments may include a wagering software application or a wagering app 110, which is a program that enables the user to place bets on individual plays in the live event 102, streams audio and video from the live event 102, and features the available wagers from the live event 102 on the mobile device 108. The wagering app 110 allows the user to interact with the wagering network 114 to place bets and provide payment/receive funds based on wager outcomes.

Further, embodiments may include a mobile device database 112 that may store some or all the user's data, the live event 102, or the user's interaction with the wagering network 114.

Further, embodiments may include a mobile device database 112 that may store some or all the user's data, the live event 102, or the user's interaction with the wagering network 114.

Further, embodiments may include the wagering network 114, which may perform real-time analysis on the type of play and the result of a play or action. The wagering network 114 (or the cloud 106) may also be synchronized with game situational data, such as the time of the game, the score, location on the field, weather conditions, and the like, which may affect the choice of play utilized. For example, in an exemplary embodiment, the wagering network 114 may not receive data gathered from the sensors 104 and may, instead, receive data from an alternative data feed, such as SportsRadar®. This data may be provided substantially immediately following the completion of any play, and may be compared with a variety of team data and league data based on a variety of elements, including the current down, possession, score, time, team, and so forth, as described in various exemplary embodiments herein. The wagering network 114 can offer several software as a service (SaaS) managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user.

Further, embodiments may include a user database 116, which may contain data relevant to all users of the wagering network 114 and may include, but is not limited to, a user ID, a device identifier, a paired device identifier, wagering history, or wallet information for the user. The user database 116 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the user database 116 may contain betting lines and search queries. The user database 116 may be searched based on a search criterion received from the user. Each betting line may include, but is not limited to, a plurality of betting attributes such as at least one of the live event 102, a team, a player, an amount of wager, etc. The user database 116 may include, but is not limited to, information related to all the users involved in the live event 102. In one exemplary embodiment, the user database 116 may include information for generating a user authenticity report and a wagering verification report. Further, the user database 116 may be used to store user statistics like, but not limited to, the retention period for a particular user, frequency of wagers placed by a particular user, the average amount of wager placed by each user, etc.

Further, embodiments may include a historical plays database 118 that may contain play data for the type of sport being played in the live event 102. For example, in American Football, for optimal odds calculation, the historical play data may include metadata about the historical plays, such as time, location, weather, previous plays, opponent, physiological data, etc.

Further, embodiments may utilize an odds database 120—that contains the odds calculated by an odds calculation module 124—to display the odds on the user's mobile device 108 and take bets from the user through the mobile device wagering app 110.

Further, embodiments may include a base module 122, which receives the sensor data from the live event 102. Then the base module 122 determines a first play situation from the received sensor data. The base module 122 determines the probability and wager odds of a first future event occurring at the present competition based on at least the first play situation and playing data associated with at least a subset of one or both of the first set of one or more participants and the at least second set of one or more participant. The base module 122 provides the wager odds on the wagering app 110.

Further, embodiments may include the odds calculation module 124, which utilizes historical play data to calculate odds for in-play wagers. For example, the odds calculation module 124 may continuously poll for the data from the live event 102. The odds calculation module 124 may receive the data from the live event 102. The odds calculation module 124 may store the results data, or the results of the last action, in the historical play database 118, which may contain historical data of all previous actions. The odds calculation module 124 may filter the historical play database 118 based on the team and inning from the situational data. The first parameter of the historical plays database 118 is selected, for example, the event. Then the odds calculation module 124 performs correlations on the data. For example, the historical play database 118 may be filtered on the team, the players, the inning, and the number of outs. The first parameter is selected in this example, the event, which may be a stolen base, and the historical play database 118 is filtered on the event being a stolen base. Then, correlations are performed on the rest of the parameters: for example, how far away is the baserunner from the first base, how far away is the first baseman from the first base, and how far away is the second baseman from the second base, etc. In an example of correlated data, the correlated data for the historical data involving the Red Sox in the second inning with one out recorded and the action being a stolen base, may have a correlation coefficient of 0.81. The correlations are also performed with the same filters, and the next event, which is the runner is caught stealing, has a correlation coefficient of 0.79. It is determined if the correlation coefficient is above a predetermined threshold, for example, 0.75, in order to determine if the data is highly correlated and deemed a relevant correlation. If the correlation is deemed highly relevant, then the correlation coefficient is extracted from the date. For example, the two correlation coefficients of 0.81 for a stolen base and 0.79 for a runner caught stealing are both extracted. If it is determined that the correlations are not highly relevant, then then it is determined if any parameters are remaining. Also, if the correlations were determined to be highly relevant and therefore extracted, it is also determined if any parameters are remaining to perform correlations on. If there are additional parameters to have correlations performed, then the odds calculation module 124 selects the next parameter in the historic action database and returns to performing correlations on the data. Once there are no remaining parameters to perform correlations on, the odds calculation module 124 determines the difference between each of the extracted correlations. For example, the correlation coefficient for a stolen base is 0.81, and the correlation coefficient for a runner caught stealing is 0.79. The difference between the two correlation coefficients (0.81−0.79) is 0.02. In some embodiments, the difference may be calculated by using subtraction on the two correlation coefficients. In some embodiments, the two correlation coefficients may be compared by determining the statistical significance. The statistical significance, in an embodiment, can be determined by using the following formula: Zobserved=(z1−z2)/(square root of [(1/N1−3)+(1/N2−3)], where z1 is the correlation coefficient of the first dataset, z2 is the correlation coefficient of the second dataset, N1 is the sample size of the first dataset, and N2 is the sample size of the second dataset, and the resulting Zobserved may be used instead of the difference of the correlation coefficients in a recommendations database 128 to compare the two correlation coefficient based on statistical significance as opposed to the difference of the two correlation coefficients. Alternatively another method well known in the art may be used. The difference between the two correlation coefficients, 0.02, is then compared to the recommendations database 128. The recommendations database 128 contains various ranges of differences in correlations as well as the corresponding odds adjustment for those ranges. For example, the 0.02 difference of the two correlation coefficients falls into the range +0-2 difference in correlations which, according to the recommendations database 128, may have an odds adjustment of 5% increase. The odds calculation module 124 then extracts the odds adjustment from the recommendations database 128. The extracted odds adjustment is stored in an adjustment database 130. The odds calculation module 124 compares the odds database 120 to the adjustment database 130. It is determined whether or not there is a match in any of the wager IDs in the odds database 120 and the adjustment database 130. For example, the odds database 120 contains a list of all the current bet options for a user. The odds database 120 contains a wager ID, event, time, inning, wager, and odds for each bet option. The adjustment database 130 contains the wager ID and the percentage, either as an increase or decrease, that the odds should be adjusted. If there is a match between the odds database 120 and the adjustment database 130, then the odds in the odds database 120 are adjusted by the percentage increase or decrease in the adjustment database 130, and the odds in the odds database 120 are updated. For example, if the odds in the odds database 120 are −105 and the matched wager ID in the adjustment database 130 is a 5% increase, then the updated odds in the odds database 120 should be −110. If there is a match, the odds are adjusted based on the data stored in the adjustment database 130 and the new data stored in the odds database 120 over the old entry. If there are no matches, or once the odds database 120 has been adjusted if there are matches, the odds calculation module 124 offers the odds database 120 to the wagering app 110, allowing users to place bets on the wagers stored in the odds database 120. In other embodiments, it may be appreciated that the previous formula may be varied depending on a variety of reasons, for example, adjusting odds based on further factors or wagers, adjusting odds based on changing conditions or additional variables, or based on a desire to change wagering action.

Additionally, in other example embodiments, one or more alternative equations may be utilized in the odds calculation module 124. One such equation could be Zobserved=(z1−z2)/(square root of [(1/N1−3)+(1/N2−3)], where z1 is the correlation coefficient of the first dataset, z2 is the correlation coefficient of the second dataset, N1 is the sample size of the first dataset, and N2 is the sample size of the second dataset, and the resulting Zobserved to compare the two correlation coefficient based on statistical significance as opposed to the difference of the two correlation coefficients. Another equation used may be Z=b1−b2/Sb1−b2 to compare the slopes of the datasets or may introduce any of a variety of additional variables, such as b1 is the slope of the first dataset, b2 is the slope for the second dataset, Sb1 is the standard error for the slope of the first dataset and Sb2 is the standard error for the slope of the second dataset. The results of calculations made by such equations may then be compared to the recommendation data, and the odds calculation module 124 may then extract an odds adjustment from the recommendations database 128. The extracted odds adjustment is then stored in the adjustment database 130. In some embodiments, the recommendations database 128 may be used in the odds calculation module 124 to determine how the wager odds should be adjusted depending on the difference between the correlation coefficients of the correlated data points. The recommendations database 128 may contain the difference in correlations and the odds adjustment. For example, if there is a correlation coefficient for a Red Sox second inning with a runner on base with one out and a stolen base of 0.81 and a correlation coefficient for a Red Sox second inning with a runner on base with one out and the runner caught stealing of 0.79, the difference between the two would be +0.02 when compared to the recommendations database 128 the odds adjustment would be a 5% increase for a Red Sox stolen base or otherwise identified as wager 201 in the adjustment database 130. In some embodiments, the difference in correlations may be the statistical significance of comparing the two correlation coefficients in order to determine how the odds should be adjusted. In some embodiments, the adjustment database 130 may be used to adjust the wager odds of the odds database 120 if it is determined that a wager should be adjusted. The adjustment database 130 contains the wager ID, which is used to match with the odds database 120 to adjust the odds of the correct wager.

Further, embodiments may include a tracking system 126, which is associated with one or more tracking devices and anchors. The tracking system 126 may include one or more central processing units (CPUs), a peripherals interface, a memory controller, a network or other communications interface, a memory, for example, a random access memory, a user interface, the user interface including a display and an input, such as a keyboard, a keypad, a touch screen, etc., an input/output (I/O) subsystem, one or more communication busses for interconnecting the components as mentioned above, and a power supply system for powering the components mentioned above. In some embodiments, the input is a touch-sensitive display, such as a touch-sensitive surface. In some embodiments, the user interface includes one or more soft keyboard embodiments. The soft keyboard embodiments may include standard (QWERTY) and/or non-standard configurations of symbols on the displayed icons. It may be appreciated that the tracking system 126 is only one example of a system that may be used in engaging with various tracking devices and that the tracking system 126 optionally has more or fewer components than described, optionally combines two or more components, or optionally has a different configuration or arrangement of the components. The various components described are implemented in hardware, software, firmware, or a combination thereof, including one or more signal processing and/or application-specific integrated circuits. Memory optionally includes high-speed random access memory, and optionally also includes non-volatile memory, such as one or more magnetic disk storage devices, flash memory devices, or other non-volatile solid-state memory devices. Access to memory by other tracking system components, such as CPU(s), is, optionally, controlled by a memory controller. Peripherals interface can be used to couple input and output peripherals of the tracking system 126 to CPU(s) and memory. One or more processors run or execute various software programs and/or sets of instructions stored in memory to perform various functions for the tracking system 126 and to process data. In some embodiments, peripherals interface, CPU(s), and memory controller are, optionally, implemented on a single chip. In some other embodiments, they are, optionally, implemented on separate chips. In some embodiments, power system optionally includes a power management system, one or more power sources (e.g., battery, alternating current (AC)), a recharging system, a power failure detection circuit, a power converter or inverter, a power status indicator (e.g., a light-emitting diode (LED), etc.) and any other components associated with the generation, management and distribution of power in portable devices. In some embodiments, the tracking system 126 may include a tracking device manager module for facilitating management of one or more tracking devices, the tracking device manager module may include a tracking device identifier store for storing pertinent information related to each respective tracking device, including a tracking device identifier and a tracking device ping rate, and a tracking device grouping store for facilitating management of or more tracking device groups. The tracking device identifier store includes information related to each respective tracking device, including the tracking device identifier (ID) for each respective tracking device as well as a tracking device group to which the respective tracking device is associated. In some embodiments, a first tracking device group is associated with the left shoulder of each respective subject, and a second tracking device group is associated with a right shoulder of each respective subject. In some embodiments, a third tracking device group is associated with a first position: first baseman, second baseman, shortstop, baserunner, pitcher, etc., of each respective subject, and a fourth tracking device group is associated with a second position. Grouping the tracking devices allows for a particular group to be designated with a particular ping rate, for example, a faster ping rate for baserunners. Grouping the tracking devices also allows for a particular group to be isolated from other tracking devices that are not associated with the respective group, which is useful in viewing representations of the telemetry data provided by the tracking devices of the group.

Further, embodiments may include the recommendations database 128 that may be used in the odds calculation module 124 to determine how the wager odds should be adjusted depending on the difference between the correlation coefficients of the correlated data points. The recommendations database 128 may contain the difference in correlations and the odds adjustment. For example, if there is a correlation coefficient for a Red Sox second inning with a runner on base with one out and a stolen base of 0.81 and a correlation coefficient for a Red Sox second inning with a runner on base with one out and the runner caught stealing of 0.79, the difference between the two would be +0.02 when compared to the recommendations database 128 the odds adjustment would be a 5% increase for a Red Sox stolen base or otherwise identified as wager 201 in the adjustment database 130. In some embodiments, the difference in correlations may be the statistical significance of comparing the two correlation coefficients in order to determine how the odds should be adjusted.

Further, embodiments may include an adjustment database 130 that may be used to adjust the wager odds of the odds database 120 if it is determined that a wager should be adjusted. The adjustment database 130 contains the wager ID, which is used to match with the odds database 120 to adjust the odds of the correct wager.

Figure 2:
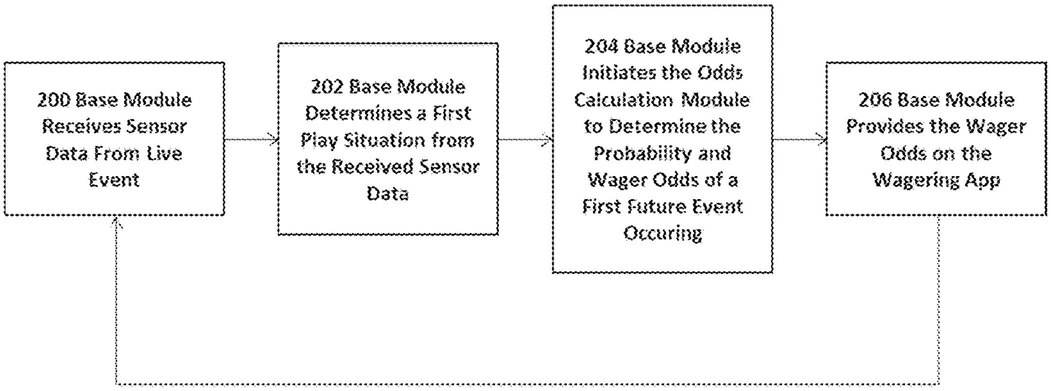
FIG. 2 illustrates a base module, according to an embodiment.

FIG. 2 Illustrates the base module 122. the base module 122 receives, at step 200, the sensor data from the live event 102. For example, the base module 122 receives time-stamped position information of one or more participants of one or both of the first set of participant(s) and the at least second set of participant(s) in the present competition is received, the time-stamped position information captured by the sensors 104 at the live event 102 during the present competition. For example, the sensor data may be collected by a system including the tracking system 126, tracking devices, anchor devices, etc. The time-stamped position information may include an XY- or XYZ-position of each participant of a first subset and a second subset of players with respect to a predefined space, for example, a game field, such as a football field, etc.

The first subset and the second subset can include any number of participants such as each subset including one participant, each subset including two or more participants, or each subset including all the participants of the first competitor and the second competitor, respectively, that are on the field during the first time point. Then the base module 122 determines, at step 202, a first play situation from the received sensor data. For example, the base module 122 receives the time-stamped position information and is used to determine a first play situation of the present competition, such as a current play situation. In various embodiments, the play situation is determined using, at least in part, time-stamped position information of each player in the subsets of players at the given time. For example, the process determines the play situation at a first time point which is a current time of a competition while the competition is ongoing, and the time-stamped position information has been collected by the sensors 104 at the present competition through the first time point.

In various embodiments, determining the play situation uses a set of parameters, including a current team, inning, outs recorded, baserunners, and defensive positions describing the play situation at the given time. In some embodiments, the data describing the play situation of the live sports event further includes motion, temperature, or humidity sensors, optical sensors, and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include, but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball. In some embodiments, telemetry data that an array of anchors may receive from one or more tracking devices which may include positional telemetry data. The positional telemetry data provides location data for a respective tracking device, which describes the location of the tracking device within a spatial region. In some embodiments, this positional telemetry data is provided as one or more Cartesian coordinates (e.g., an X coordinate, a Y coordinate, and/or Z a coordinate) that describe the position of each respective tracking device.

However, any coordinate system (e.g., polar coordinates, etc.) that describes the position of each respective tracking device is used in alternative embodiments. The telemetry data received by the array of anchors from the one or more tracking devices includes kinetic telemetry data. The kinetic telemetry data provides data related to various kinematics of the respective tracking device. In some embodiments, this kinetic telemetry data is provided as a velocity of the respective tracking device, an acceleration of the respective tracking device, and/or a jerk of the respective tracking device. Further, in some embodiments, one or more of the above values is determined from an accelerometer of the respective tracking device and/or derived from the positional telemetry data of the respective tracking device. Further, in some embodiments, the telemetry data received by the array of anchors from the one or more tracking devices includes biometric telemetry data. The biometric telemetry data provides biometric information related to each subject associated with the respective tracking device. In some embodiments, this biometric information includes a heart rate of the subject, temperature, for example, a skin temperature, a temporal temperature, etc. In some embodiments, the array of anchors communicates the above-described telemetry data, for example, positional telemetry, kinetic telemetry, and/or biometric telemetry, to a telemetry parsing system. Accordingly, in some embodiments, the telemetry parsing system communicates the telemetry data to the odds calculation module 122. In some embodiments, an array of anchor devices may receive telemetry data from one or more tracking devices. In order to minimize error in receiving the telemetry from the one or more tracking devices, the array of anchor devices preferably includes at least three anchor devices. Inclusion of at least three anchor devices within the array of anchor devices allows for each ping, for example, telemetry data received from a respective tracking device, to be triangulated using the combined data from the at least three anchors that receive the respective ping.

The position may be defined as an XY- or XYZ-coordinate for each player with respect to a predefined space, such as a field where the sporting event occurs, such as pitcher's location, catcher's location, baserunner's location, first base location, first baseman location, etc. The player configuration includes positions of the player with respect to each other, as well as with respect to the bases, pitcher's mound, home plate, foul lines, etc. Such positional data is used for recognizing patterns for deriving player configurations in play situations as well as for tracking next events, for example, a baserunner's lead, the position of the first baseman, second baseman, shortstop, etc. In various embodiments, determining a prediction of the probability of a first future event includes using historical playing data of one or more participants in one or both of the first set of participant (s) and the at least second set of participant(s). That is, the process determines a prediction of the probability of a first future event occurring at a live sports event based upon at least (i) the playing data, (ii) the play situation, and (iii) the historical playing data. Historical data refers to play-by-play data that specifies data describing play situations and next play events that have occurred after each play situation. The historical play-by-play data includes historical outcomes of next plays from given player configurations. For example, the historical play-by-play data includes a plurality of next play events that have occurred after a given play situation. For baseball, the given play situation includes the player's configuration in the field, a current inning, a number of outs recorded, a number of baserunners, a number of pitches thrown, a number of pitches called strikes, a number of pitches called balls, etc. In some embodiments, such historical data also includes data collected so far during a live sports event. In some embodiments, the historical data further includes play-by-play data recorded and published by a league, such as the MLB, NBA, NHL, NFL, etc.

In some embodiments, historical playing data is stored in the historical plays database 118 for each participant of at least the first and second subset of participants in a plurality of historical games in the league. In some embodiments, the historical data is used to identify historical play situations corresponding to the play situation at the first time point and providing a prediction of the next event based on the historical play events that have occurred after similar play situations. In some embodiments, the historical playing data includes player telemetry data for each player of at least the first and second subset of players in the plurality of historical games in the league. In some embodiments, the historical playing data includes historical states for player configurations. The current play situation with the present player configuration is compared with the historical states for player configurations to predict the next event in the present game. In some embodiments, the historical states for each player configuration of the player configurations includes player types included in the respective player configuration or a subset of the player types included in the respective player configuration. In some embodiments, the plurality of historical games spans a plurality of seasons over a plurality of years. The historical playing data may be for the same type of sport or competition involving the first and second competitors. The first and second competitors may have different team members compared with the current configuration of the team or may have some of the same team members. The base module 122 initiates, at step 204, the odds calculation module 124 to determine the probability and wager odds of a first future event occurring at the present competition based on at least the first play situation and playing data associated with at least a subset of one or both of the first set of one or more participants and the at least second set of one or more participant. The base module 122 provides, at step 206, the wager odds on the wagering app 110. In various embodiments, the wager odds may be transmitted to the wagering app 110 through the wager network 114 to be displayed on the mobile device 108. In some embodiments, the wagering app 110, which is a program that enables the user to place bets on individual plays in the live event 102, streams audio and video from the live event 102, and features the available wagers from the live event 102 on the mobile device 108. The wagering app 110 allows users to interact with the wagering network 114 to place bets and provide payment/receive funds based on wager outcomes.

Figure 3:
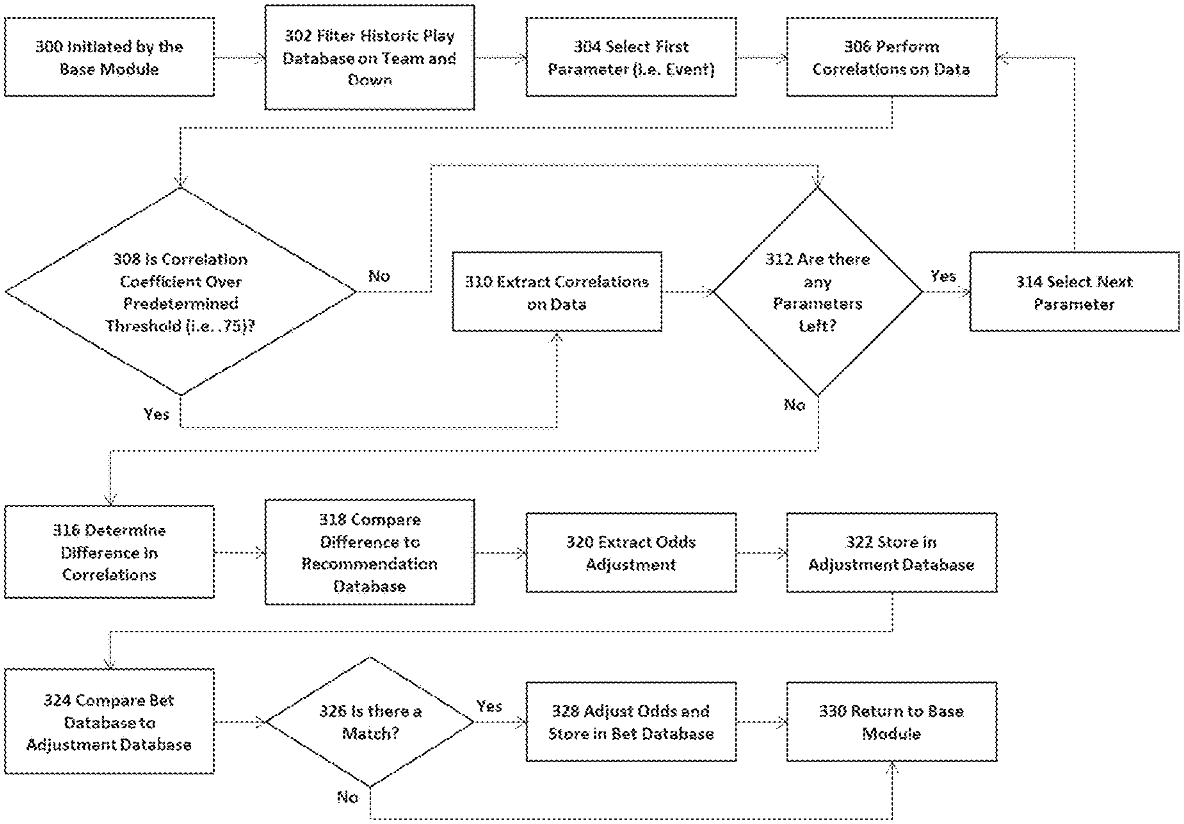
FIG. 3 illustrates an odds calculation module, according to an embodiment.

FIG. 3 illustrates the odds calculation module 124. The odds calculation module 124 is initiated, at step 300, by the base module 122. In some embodiments, the odds calculation module 124 may continuously poll for the data from the live event 102. In some embodiments, the odds calculation module 124 may receive the data from the live event 102. In some embodiments, the odds calculation module 124 may store the results data, or the results of the last action, in the historical play database 118, which may contain historical data of all previous actions. The odds calculation module 124 filters, at step 302, the historical play database 118 on the team and inning from the situational data. The odds calculation module 124 selects, at step 304, the first parameter of the historical plays database 118, for example, the event. Then the odds calculation module 124 performs, at step 306, correlations on the data. For example, the historical play database 118 is filtered on the team, the players, the inning, and the number of outs. The first parameter is selected, which in this example is the event, which may be a stolen base, and the historical play database 118 is filtered on the event being a stolen base. Then, correlations are performed on the rest of the parameters, which are how far away the baserunner is from first base, how far away is the first baseman from first base, and how far away is the second baseman from second base, etc. In an example of correlated data, the correlated data for the historical data involving the Red Sox in the second inning with one out recorded and the action being a stolen base, which has a correlation coefficient of 0.81. The correlations are also performed with the same filters, and the next event, which is the action being the runner is caught stealing, has a correlation coefficient of 0.79. Then the odds calculation module 124 determines, at step 308, if the correlation coefficient is above a predetermined threshold, for example, 0.75, in order to determine if the data is highly correlated and deemed a relevant correlation. If the correlation is deemed highly relevant, then the odds calculation module 124 extracts, at step 310, the correlation coefficient from the data. For example, the two correlation coefficients of 0.81 for a stolen base and 0.79 for a runner caught stealing are both extracted. If it is determined that the correlations are not highly relevant, then the odds calculation module 124 determines, at step 312, if any parameters are remaining. Also, if the correlations were determined to be highly relevant and therefore extracted, it is also determined if any parameters are remaining to perform correlations on. If there are additional parameters to have correlations performed, then the odds calculation module 124 selects, at step 314, the next parameter in the historical plays database 118, and the process returns to performing correlations on the data. Once there are no remaining parameters to perform correlations on, the odds calculation module 124 then determines, at step 316, the difference between each of the extracted correlations. For example, the correlation coefficient for a stolen base is 0.81, and the correlation coefficient for a runner caught stealing is 0.79. The difference between the two correlation coefficients (0.81−0.79) is 0.02. In some embodiments, the difference may be calculated by using subtraction on the two correlation coefficients. In some embodiments, the two correlation coefficients may be compared by determining the statistical significance. The statistical significance, in an embodiment, can be determined by using the following formula: Zobserved=(z1−z2)/(square root of [(1/N1−3)+(1/N2−3)], where z1 is the correlation coefficient of the first dataset, z2 is the correlation coefficient of the second dataset, N1 is the sample size of the first dataset, and N2 is the sample size of the second dataset, and the resulting Zobserved may be used instead of the difference of the correlation coefficients in a recommendations database 128 to compare the two correlation coefficient based on statistical significance as opposed to the difference of the two correlation coefficients. Then the odds calculation module compares, at step 318, the difference between the two correlation coefficients, for example, 0.02, to the recommendations database 128. The recommendations database 128 contains various ranges of differences in correlations as well as the corresponding odds adjustment for those ranges. For example, the 0.02 difference of the two correlation coefficients falls into the range +0-2 difference in correlations which, according to the recommendations database 128, should have an odds adjustment of 5% increase. The odds calculation module 124 then extracts, at step 320, the odds adjustment from the recommendations database 128. The odds calculation module 124 then stores, at step 322, the extracted odds adjustment in the adjustment database 130. The odds calculation module 124 compares, at step 324, the odds database 120 to the adjustment database 130. The odds calculation module 124 then determines, at step 326, whether or not there is a match in any of the wager IDs in the odds database 120 and the adjustment database 130. For example, the odds database 120 contains a list of all the current bet options for a user. The odds database 120 contains a wager ID, event, time, inning, wager, and odds for each bet option. The adjustment database 130 contains the wager ID and the percentage, either as an increase or decrease, that the odds should be adjusted. If it is determined there is a match between the odds database 120 and the adjustment database 130, then the odds calculation module 124 adjust, at step 328, the odds in the odds database 120 by the percentage increase or decrease in the adjustment database 130 and the odds in the odds database 120 are updated. For example, if the odds in the odds database 120 are −105 and the matched wager ID in the adjustment database 130 is a 5% increase, then the updated odds in the odds database 120 should be −110. If there is a match, the odds are adjusted based on the data stored in the adjustment database 130 and the new data stored in the odds database 120 over the old entry. If there are no matches, or, once the odds database 120 has been adjusted if there are matches, the odds calculation module 124 returns, at step 330, to the base module 122. In some embodiments, the odds calculation module 124 may offer the odds database 120 to the wagering app 110, allowing users to place bets on the wagers stored in the odds database 120. In other embodiments, it may be appreciated that the previous formula may be varied depending on a variety of reasons, for example, adjusting odds based on further factors or wagers, adjusting odds based on changing conditions or additional variables, or based on a desire to change wagering action. Additionally, in other example embodiments, one or more alternative equations may be utilized in the odds calculation module 124. One such equation could be Zobserved=(z1−z2)/(square root of [(1/N1−3)+(1/N2−3)], where z1 is the correlation coefficient of the first dataset, z2 is the correlation coefficient of the second dataset, N1 is the sample size of the first dataset, and N2 is the sample size of the second dataset, and the resulting Zobserved to compare the two correlation coefficient based on statistical significance as opposed to the difference of the two correlation coefficients. Another equation used may be Z=b1−b2/Sb1−b2 to compare the slopes of the datasets or may introduce any of a variety of additional variables, such as b1 is the slope of the first dataset, b2 is the slope for the second dataset, Sb1 is the standard error for the slope of the first dataset and Sb2 is the standard error for the slope of the second dataset. The results of calculations made by such equations may then be compared to the recommendation data, and the odds calculation module 124 may then extract an odds adjustment from the recommendations database 128. The extracted odds adjustment is then stored in the adjustment database 130. In some embodiments, the recommendations database 128 may be used in the odds calculation module 124 to determine how the wager odds should be adjusted depending on the difference between the correlation coefficients of the correlated data points. The recommendations database 128 may contain the difference in correlations and the odds adjustment. For example, if there is a correlation coefficient for a Red Sox second inning with a runner on base with one out and a stolen base of 0.81 and a correlation coefficient for a Red Sox second inning with a runner on base with one out and the runner caught stealing of 0.79, the difference between the two would be +0.02 when compared to the recommendations database 128 the odds adjustment would be a 5% increase for a Red Sox stolen base or otherwise identified as wager 201 in the adjustment database 130. In some embodiments, the difference in correlations may be the statistical significance of comparing the two correlation coefficients in order to determine how the odds should be adjusted. In some embodiments, the adjustment database 130 may be used to adjust the wager odds of the odds database 120 if it is determined that a wager should be adjusted. The adjustment database 130 contains the wager ID, which is used to match with the odds database 120 to adjust the odds of the correct wager.

FIG. 4 illustrates the recommendations database 128. The recommendations database 128 may be used in the odds calculation module 124 to determine how the wager odds should be adjusted depending on the difference between the correlation coefficients of the correlated data points. The recommendations database 128 may contain the difference in correlations and the odds adjustment. For example, if there is a correlation coefficient for a Red Sox second inning with a runner on base with one out and a stolen base of 0.81 and a correlation coefficient for a Red Sox second inning with a runner on base with one out and the runner caught stealing of 0.79, the difference between the two would be +0.02 when compared to the recommendations database 128 the odds adjustment would be a 5% increase for a Red Sox stolen base or otherwise identified as wager 201 in the adjustment database 130. In some embodiments, the difference in correlations may be the statistical significance of comparing the two correlation coefficients in order to determine how the odds should be adjusted.

FIG. 5 illustrates the adjustment database 130. The adjustment database 130 may be used to adjust the wager odds of the odds database 120 if it is determined that a wager should be adjusted. The adjustment database 130 contains the wager ID, which is used to match with the odds database 120 to adjust the odds of the correct wager.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for wagering on event outcomes, comprising:

a live event;

at least one competitor;

at least one processor;

at least one memory having instructions stored thereon executed by the at least one processor to:

identify a first action situation;

identify at least one plurality of possible future states regarding the live event;

initiate an odds calculation module to determine probability and wager odds of an at least one future event occurring based on the first play situation;

generate at least one wager based on the probability and wager odds of the at least one future event occurring, and provide the wager to a wagering application interface;

filter a historical plays database based on the first action situation, and use the odds calculation module and historical plays data from the historical plays database to determine the probability and wager odds of the at least one future event occurring; and recalculate, using the odds calculation module, the wager odds based on a comparison of different correlations which are determined by the filtering of the historical plays database and performing correlations on the filtered data based on one or more parameters.

2. A system for wagering on event outcomes, comprising:

a live event;

at least one competitor;

at least one processor;

at least one sensor or tracking device;

at least one memory having instructions stored thereon executed by the at least one processor to:

identify a first action situation using the at least one sensor or tracking device;

identify at least one plurality of possible future states regarding the live event;

initiate an odds calculation module to determine probability and wager odds of an at least one future event occurring based on the first action situation;

generate at least one wager based on the probability and wager odds of the at least one future event occurring, and provide the wager to a wagering application interface; and determine, using the odds calculation module, the wager odds based on a comparison of different correlations which are determined by the filtering of the historical plays database and performing correlations on the filtered data based on one or more parameters.

3. The system for wagering on event outcomes of claim 2, wherein the at least one sensor is a camera.

4. The system for wagering on event outcomes of claim 2, wherein the at least one sensor is a motion sensor, a temperature sensor, a humidity sensor, an optical sensor, a camera, a microphone, a radio receiver, a thermal imager, a tracking device, a touch sensor, and/or an accelerometer.

5. The system for wagering on event outcomes of claim 2, wherein the at least one tracking device is an RFID tag.

6. The system for wagering on event outcomes of claim 5, wherein the RFID tag is embedded on at least one of a person and an object involved in the action.

7. The system for wagering on event outcomes of claim 2, wherein the at least one tracking device is GPS chip.

8. The system for wagering on event outcomes of claim 2, wherein the odds calculation module filters a historical plays database based on the first action situation and uses filtered data to determine probability and wager odds of the at least one future event occurring.

* * * * *